(12) United States Patent
Jankowiak et al.

(10) Patent No.: US 7,727,425 B2
(45) Date of Patent: Jun. 1, 2010

(54) METHOD FOR MANUFACTURING AN IGNITION PLUG AND IGNITION PLUG PRODUCED IN THAT MANNER

(75) Inventors: Aurélien Jankowiak, Ostwald (FR); François Collardey, Vermondans (FR); Philippe Blanchart, Limoges (FR)

(73) Assignee: Vibro Meter France, Paris (FR)

( * ) Notice: Subject to any disclaimer, the term of this patent is extended or adjusted under 35 U.S.C. 154(b) by 721 days.

(21) Appl. No.: 11/540,591

(22) Filed: Oct. 2, 2006

(65) Prior Publication Data
US 2007/0077846 A1  Apr. 5, 2007

(30) Foreign Application Priority Data
Oct. 3, 2005  (FR) .................................. 05 10086

(51) Int. Cl.
*H01B 1/04* (2006.01)
*H01B 3/14* (2006.01)

(52) U.S. Cl. .............................. 252/520.5; 252/62.3 C; 252/516; 252/521.2; 264/620; 313/130; 313/131; 313/131.1; 313/256; 313/268

(58) Field of Classification Search ............ 252/62.3 C, 252/516, 518, 519, 521, 521.2; 264/620; 313/130, 131, 131.1, 256, 268
See application file for complete search history.

(56) References Cited

U.S. PATENT DOCUMENTS 3,376,367 A * 4/1968 Subramanya et al. ....... 264/620
3,630,770 A    12/1971 Favreau
4,999,137 A *  3/1991 Wapler et al. ............... 252/516
5,028,346 A *  7/1991 Dulin ..................... 252/62.3 C

FOREIGN PATENT DOCUMENTS

EP    0 370 837    5/1990

OTHER PUBLICATIONS

Patent Abstracts of Japan, vol. 2003, No. 08, Aug. 6, 2003 & jp 2003 095744 a (nippon tungsten co ltd), Apr. 3, 2003 *abrege; exemple 15*.

* cited by examiner

*Primary Examiner*—Mark Kopec
*Assistant Examiner*—Khanh Tuan Nguyen
(74) *Attorney, Agent, or Firm*—Young & Thompson

(57) ABSTRACT

Method for manufacturing a high-energy, low-voltage ignition plug comprising a ceramic material between its electrodes:
  there is mixed, in a container containing a liquid, from 50 to 75% of a compound which is intended to form a conductive phase and from 25 to 50% of one or more materials which allow the formation of phases of yttrium garnet after thermal processing;
  operations are carried out for pulverizing, drying and sieving the admixture;
  the admixture is pressed or injected into a mould;
  sintering is carried out so as to obtain a ceramic material having porosity of between 0 and 30%;
  the ceramic material is used in order to constitute the material located between the electrodes of a high-energy, low-voltage ignition plug.
Ignition plug manufactured in that manner.

11 Claims, 2 Drawing Sheets

METHOD FOR MANUFACTURING AN IGNITION PLUG AND IGNITION PLUG PRODUCED IN THAT MANNER

TECHNICAL FIELD

The invention relates to the field of ignition plugs, and more particularly that of ceramic materials used in the manufacture of plugs of the high-energy, low-voltage type.

BACKGROUND OF THE INVENTION

It should be noted that ignition plugs, in particular for gas turbines and reaction motors, can be of two types:
- plugs of the high-energy, high-voltage (HEHV) type, whose operating voltage is in the order of 20 kV;
- plugs of the high-energy, low-voltage (HELV) type, whose operating voltage is in the order of from 2 to 3 kV;

they are capable of supplying energy of from a few tenths of a joule up to several joules.

HELV plugs comprise a material, such as a cermet, between their electrodes so that the application of an adequate voltage between the electrodes leads to the passage of a spark.

The characteristics of the material during the different phases of the spark has been analysed as follows.

Firstly, the material is active during the ionisation phase which corresponds to an accumulation of charges at the surface of the material. The arcing phase then follows and corresponds to an intermediate zone, during which there is gradual propagation of micro-arcs at the surface. Finally, the sparking phase occurs, during which the material is inactive but is subjected to great mechanical and thermal stresses brought about by the passage of the spark.

It should be noted that, in the common language of ignition plug manufacturers, this material is sometimes referred to as being a "semi-conductor". However, that usage does not really correspond to the real circumstances because, during the arcing phase, the material does become a conductor at its surface, but not over the entirety of its volume.

The advantages of HELV plugs are, on the one hand, linked with their operation which is not very dependent on the conditions present in the combustion chamber (re-ignition at high pressure), and, on the other hand, linked with the less important ignition train which it is simply necessary to provide in order to ensure their operation. It is those advantages which led to the development of ceramic materials based on silicon carbide, which are described in particular in documents U.S. Pat. No. 5,028,346 and FR-A-2 346 881. Those materials also contain an insulating phase based, for example, on silicon nitride and modified silicon oxynitride, on silicon dioxide, aluminium oxide and alkaline-earth oxide.

However, those systems have not become generally used in motors because the service life of a plug of that type becomes greatly reduced in the event of use under harsh conditions, that is to say, at high pressures and high temperatures combined with chemical attacks linked with the type of fuel used.

In the case of HEHV plugs, it is the wear of the electrodes which limits the service life of the plugs, whilst in the case of HELV plugs the wear of the material placed between the electrodes occurs substantially before the wear of the electrodes, and that is what limits the service life.

The problem addressed by the invention is to increase the service life and therefore the reliability of plugs of the HELV type.

To that end, the invention relates to a method for manufacturing a high-energy, low-voltage ignition plug comprising a ceramic material between its electrodes, characterised in that:
- there is mixed, in a container containing a liquid, from 50 to 75% by mass of a compound which is intended to form a conductive phase and from 25 to 50% by mass of one or more materials which allow the formation of phases of yttrium garnet after thermal processing;
- operations are carried out for pulverising, drying and sieving the admixture;
- the admixture is pressed or injected into a mould;
- sintering of the admixture is carried out so as to obtain a ceramic material having porosity of between 0 and 30%;
- the ceramic material is used in order to constitute the material located between the electrodes of a high-energy, low-voltage ignition plug.

The conductive phase is preferably selected from SiC and $MoSi_2$ and admixtures thereof.

The porosity of the ceramic material obtained is preferably between 0 and 15%.

There is preferably added to the admixture a thermoemissive doping agent at a proportion of up to 30% of the total mass of the compounds which are intended to form the conductive and insulating phases.

From 3 to 60% by mass, relative to the total mass of the compounds which are intended to form the conductive and insulating phases, of one or more organic binding and/or plasticising compounds is preferably added to the admixture, and a de-binding operation is carried out after the pressing or injection and before the sintering operation.

It is possible to carry out the pulverising in two steps, the addition of the plasticising agent being carried out between the two steps, and the second pulverising step being less energetic than the first step.

The materials which allow the formation of phases of yttrium garnet may be aluminium oxide and $Y_2O_3$.

The yttrium garnet can be an yttrium-aluminium garnet which contains one or more of the compounds $Y_2O_3$, $Al_2O_3$, $YAlO_3$, $Y_3Al_5O_{12}$, $Y_4Al_2O_9$.

The thermoemissive doping agent can be $LaB_6$.

The invention also relates to an ignition plug of the high-energy, low-voltage type, comprising a ceramic material between its electrodes, characterised in that the ceramic material is of the above type.

As will be appreciated, the invention first consists in using insulating phases of the yttrium garnet type resulting, for example, from the reaction between $Al_2O_3$ and $Y_2O_3$. They have very high levels of mechanical strength and thermomechanical resistance. Furthermore, their electrical resistivity is very high, which makes them usable in the intended fields of application.

Thus, the element located between the electrodes can withstand the great stresses, to which it is subjected during the ionisation phase (high pressure, high temperature, presence of chemical agents) and also during the sparking phase, in which it is passive but is subjected to thermal and mechanical shocks. Those shocks lead to exposure of the conductive phase particles that are located adjacent to the inter-electrode surface in the case of HELV plugs which use that material and which are known in the prior art.

The invention further allows a substantial reduction in the failure rate of the plugs, which becomes less than 1% in the long term.

BRIEF DESCRIPTION OF THE FIGURES

The invention will be better understood from a reading of the following description, given with reference to the following appended Figures.

DESCRIPTION OF PREFERRED EMBODIMENTS

Figure 1:
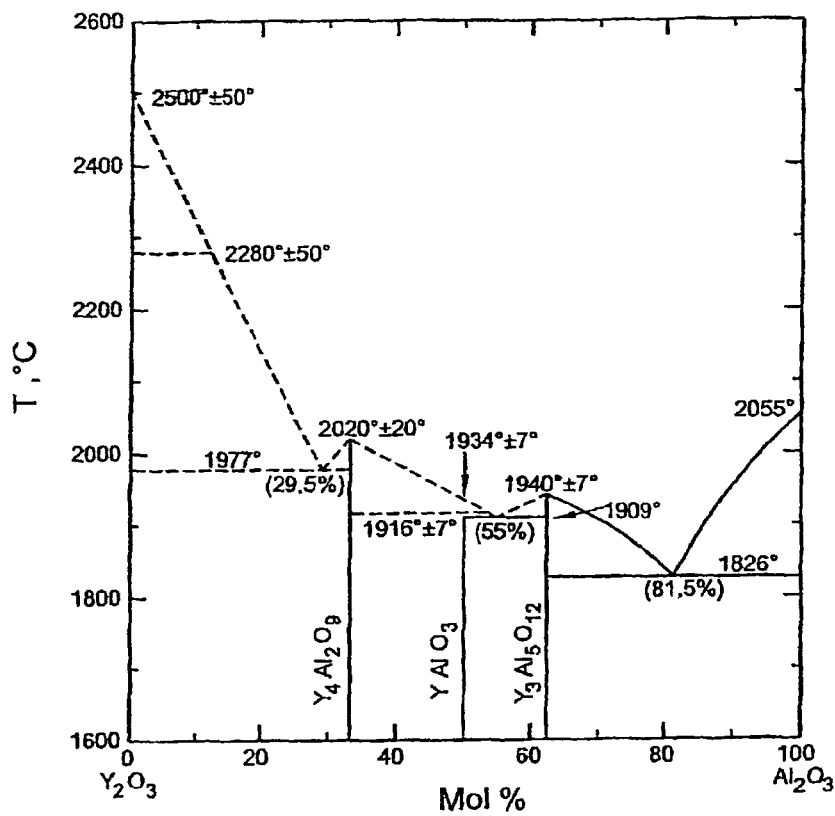
FIG. 1 which is a graph of the $Y_2O_3$—$Al_2O_3$ phases.

Preferred examples of conductive phases which can be used in the context of the invention may include SiC and $MoSi_2$, which have excellent thermomechanical properties. SiC has excellent resistance to oxidation, in particular at temperatures in the order of 650° C.

It is evident that $MoSi_2$ tends to oxidise strongly between 300° C. and 700° C. in order to form silicon dioxide and $MoO_3$, whose grain volume is far greater than that of $MoSi_2$, which in time leads to cracking of the components. At very high temperatures (1100° C. and above), however, that phenomenon does not occur because there is formed a protective layer of silicon dioxide which prevents the rapid formation of $MoO_3$. Therefore, $MoSi_2$ is well adapted to uses involving very high temperatures, for which thermoemissive doping agents are not advantageous.

With regard to the insulating phase which is an yttrium garnet, such as YAG (yttrium aluminium garnet) or an admixture of various yttrium garnets, it is obtained during the sintering operation from, for example, $Al_2O_3$ and $Y_2O_3$. An additive referred to as a "thermoemissive doping agent", such as $LaB_6$, is also preferably added.

The compounds which have been mentioned allow the formation of phases which ensure optimum densification and which impart to the ceramic material a great hardness and good mechanical and thermomechanical properties. The porosity of the ceramic material obtained must not exceed 30%, preferably 15%, in order to ensure good mechanical strength for the component and to limit the risks of the component becoming perforated by the electric arc.

The respective proportions of the various compounds necessary are, in percentages by mass relative to the total of the solid materials intended to be present in the final ceramic material:

from 50 to 75% for the materials constituting the conductive phase;
from 25 to 50% for the materials constituting the insulating phase.

There are preferably added additives which ensure better electrical operation of the component, as described in particular in patent EP-B-0 370 837. They are known as "thermoemissive doping agents". It is possible to add them at a proportion of up to 30% of the total mass of the compounds constituting the conductive phase and the materials constituting the insulating phase.

The thermoemissive additives are preferably selected from lanthanum boride $LaB_6$, titanium, barium titanate and tungsten. Lanthanum boride is a preferred example.

Compounds which make it easier to obtain a ceramic material having the desired morphology, but which are not intended to be present as such in the final product, can be used during the manufacturing operation. In particular, it is possible to use dispersing, binding and plasticising agents. The dispersing agents may be present at a proportion of up to 1% by mass relative to the two compounds constituting the conductive and insulating phases, and the plasticising and binding agents at a proportion, for example, of from 3 to 60% by mass relative to the compounds constituting the conductive and insulating phases. The binding and plasticising agents must not contain alkalines or alkaline-earth substances and must be purely organic in order not to contaminate the base composition.

Non-limiting examples of a method for manufacturing ceramic materials in accordance with the invention may include the following operating method.

During a first step, compounds which are placed in the form of powders, preferably in two sub-steps, are mixed.

In the first sub-step, 28 g of $Al_2O_3$, 5 g of $Y_2O_3$ and 10 g of $LaB_6$ are poured into a vessel. The vessel contains 10 pulverising media having a diameter of approximately 13 mm. There are added to the vessel 13 g of osmosed water, 0.3 g of DARVAN C or A88(5r,6r-2,4-bis-(4-hydroxy-3-methoxybenzyl)-1,5-dibenzyl-oxo-6-hydroxy-1,2,4-triazalcycloheptane) or DOLAPIX PC33. These compounds are dispersants. It would be possible to use liquid media other than water, for example, alcohol, but in that case it would be necessary to use other dispersants (for example, BEYCOSTAT C213, which is a phosphoric ester), the ones mentioned above not being compatible with alcohol.

Next, the admixture is pulverised at a relatively high rate, by placing the vessel in a planetary mechanism for 45 minutes. The object is to break any agglomerations of powder and to disperse the matrix well. Using a ball mill would be possible, but it would take longer to obtain a homogeneous admixture (approximately 4 hours).

In a second sub-step, there are added to the vessel 57 g of silicon carbide SiC having a mean granulometry of 10 μm and a solution containing 35 g of osmosed water, 5 g of PEG600 and 1 g of ESACOL HS26. PEG600 is a polyethylene glycol.

That compound is a plasticising agent which facilitates the subsequent pressing step. ESACOL HS26 is a binder based on guar gum. The vessel is then placed in the planetary mechanism once more and pulverising is carried out at a moderate rate for 20 minutes in order not to damage the plasticising agents. Excessively energetic pulverisation would break the polymer chains which confer on the products the resilient properties thereof. That is also the reason why the plasticising agents are not introduced into the admixture until after the first pulverising step, because it is energetic.

The admixture obtained is then dried in an oven at 70° C. for 24 hours in order to eliminate water from the admixture.

The cake obtained is pulverised using a mortar. The powder obtained is sieved with a 500 μm sieve.

The powder which has passed through the sieve is subjected to a two-step pressing operation: uniaxial pressing in a mould having a diameter of 13 mm in order to obtain a pre-mould, then isostatic pressing in a vessel at 2000 bar.

Subsequently, the pre-moulds are de-bound under pure argon at a maximum temperature of 600° C. for 3 days in order to burn the organic additives present in the pre-moulds.

Finally, the de-bound pre-moulds are placed in a graphite crucible in order to be sintered therein at between 1700 and 1950° C. for a period of time of from 30 minutes to 2 hours under controlled atmosphere, preferably under argon.

The de-binding cycle used is as follows:
rate of increase at 0.2° C./min up to 600° C.,
maintained for 5 hours at 600° C.,
rate of decrease at 10° C./min.

The sintering cycle used in this example is as follows:
rate of increase at 10° C./min up to 1800° C.,
maintained for 60 min at 1800° C.,
rate of decrease at 10° C./min as far as 20° C.

According to the invention, there is obtained a ceramic material containing SiC, $LaB_6$ and one or more of the following compounds: $Y_2O_3$, $Al_2O_3$ and $YAlO_3$, $Y_3Al_5O_{12}$, $Y_4Al_2O_9$, or others, belonging to the graph $Y_2O_3$, $Al_2O_3$ illustrated in FIG. 1 and having a total porosity (open and closed) of 25% at the maximum. The presence of various compounds containing the following elements: La, B, Al, O, Y, is also apparent.

In the specific example which has been described above, the ceramic material obtained has the following composition and morphology: SiC=57%; $LaB_6$=10%; total $Al_2O_3$, $Y_2O_3$, $YAlO_3$, $Y_3Al_5O_{12}$, $Y_4Al_2O_9$=28%; porosity=30%.

It must be understood that the details of the operating methods for obtaining the ceramic materials in accordance with the invention may differ from the examples described. The important aspect is that, finally, a ceramic material is obtained having the necessary composition and porosity levels. In particular, it may be envisaged to dispense with the uniaxial pressing operation and to carry out only isostatic pressing of the powder. However, using the two steps brings about better homogeneity of the components in terms of density, and allows only a small quantity of binding agents and plasticising agents to be used (it is possible to decrease the level to 3% by mass relative to the compounds forming the insulating and conductive phases). If only isostatic pressing is used, it is advisable to use binding agents and plasticising agents having contents of approximately 10%. Similarly, in place of introducing a plurality of compounds which will form one or more yttrium garnets during the sintering operation, it is possible to introduce directly an yttrium garnet of the type which will be sintered without being chemically modified.

The ceramic material is then processed, and incorporated in an HELV plug in order to constitute the element interposed between the electrodes thereof (and often referred to incorrectly as a "semi-conductor", as has been set out in the introduction). This HELV plug does not have any distinctive features other than the ceramic material selected.

A variant of this method consists in bringing about the shaping of the ceramic material, not by pressing in a mould followed, after de-binding and sintering, by processing, but instead by injection-moulding carried out in a non-deformable mould which confers the final shape directly on the ceramic material. Subsequently, the de-binding and sintering operations are carried out, then an optional operation for finishing the ceramic material if it is necessary to confer on it a specific surface state. In that case, it is preferable, so that the injection-moulding is carried out correctly, to use a high proportion of binding and plasticising agents, which may be up to 60% of the mass of the compounds constituting the insulating and conductive phases.

Figure 2:
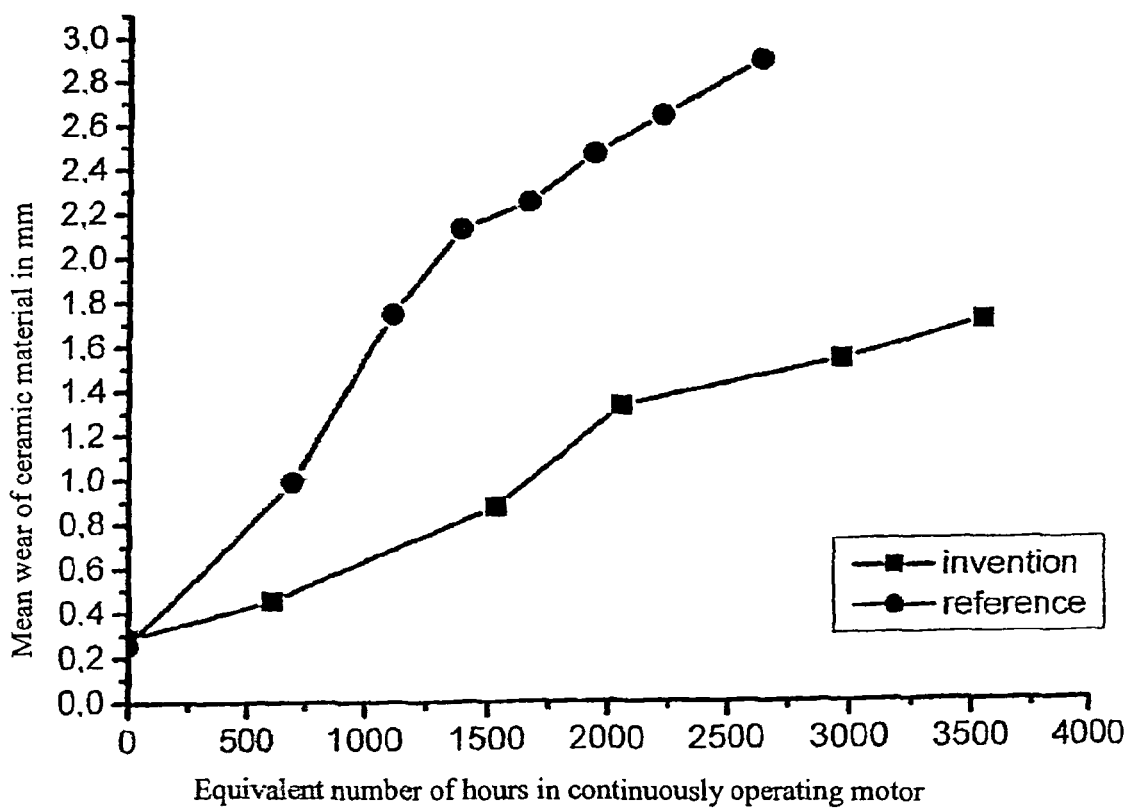
FIG. 2, which shows the mean wear in mm over time (expressed as an equivalent number of hours of continuous operation in the motor) of a reference ceramic material and a ceramic material of the invention when they are used in an HELV plug.
Figure 3:
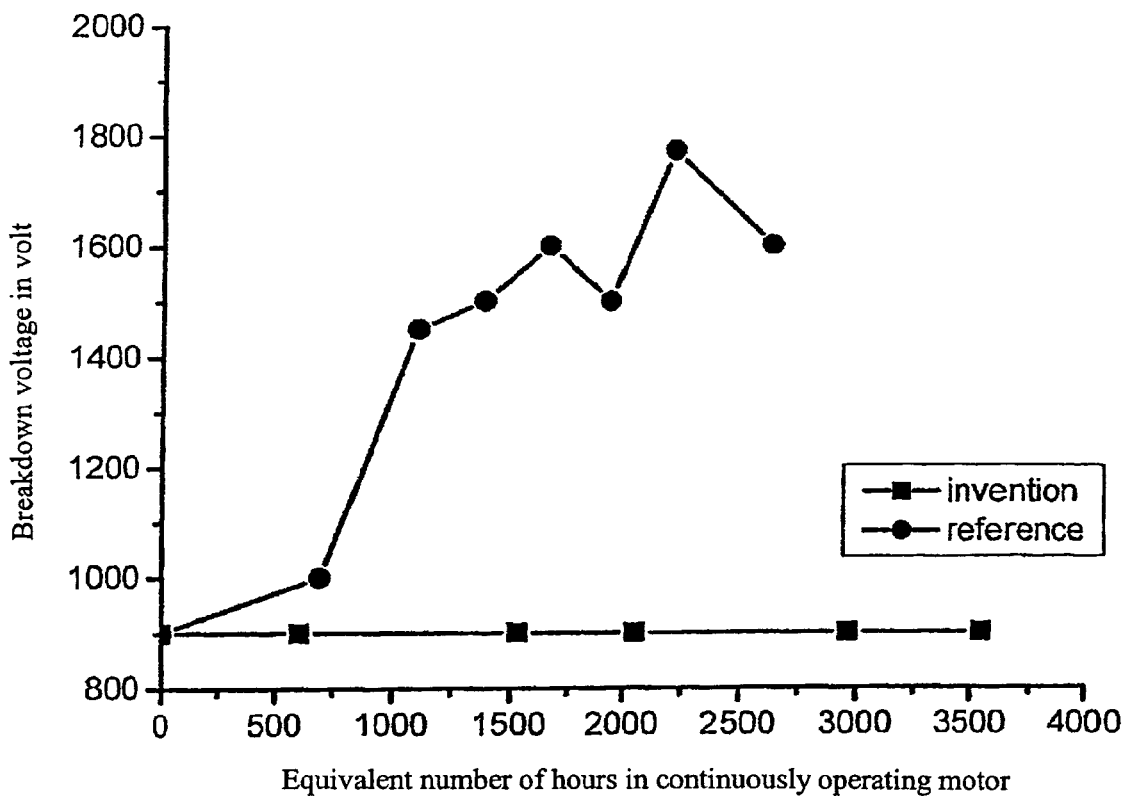
FIG. 3 which shows the variation over time of the breakdown voltage, expressed in V, of those same plugs, FIG. 4 which shows the percentage variation of failures of those same plugs.
Figure 4:
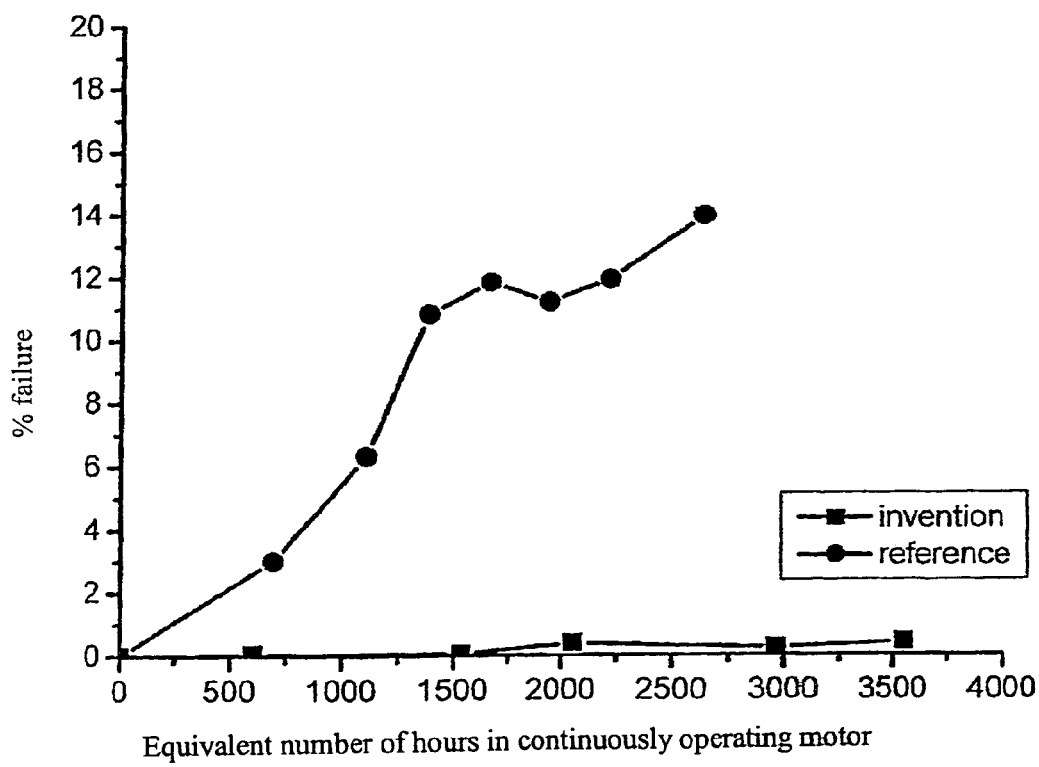

FIGS. 2, 3 and 4 set out experiment results which are obtained during endurance tests under pressure and at temperature.

Two ignition plugs are used. The first is mounted with, between its electrodes, a reference ceramic material which is representative of the prior art in accordance with document U.S. Pat. No. 5,028,346, and which contains silicon carbide, silicon nitride and a modified silicon oxynitride. It contains from 54 to 65% of SiC, from 29 to 40% of silicon nitride and from 8 to 22% of modified silicon oxynitride. The second one is mounted with a ceramic material in accordance with the invention and is manufactured in accordance with the method described in the detailed example mentioned above.

The ignition circuit includes a capacitor of 0.33 μF, the pressure in the chamber is 14 bar and the temperature is fixed at 500° C. The pulse frequency is 6 Hz. The breakdown voltage of the two plugs is found to be 900V.

FIG. 2 shows the mean wear depth of the ceramic material relative to the peripheral electrode (expressed in mm) in accordance with the time expressed as the equivalent number of hours in the motor. The measured wear of the ceramic material of the prior art is substantially greater (in the order of 2 times greater) than that measured for the ceramic material according to the invention.

Furthermore, as illustrated by FIG. 3, the breakdown voltage measured at the end of the test (approximately equivalent to 2500 hours in the motor) increases up to 1400V for the ceramic material of the prior art, whilst it remains at 900V for the ceramic material according to the invention which has remarkable stability from this point of view.

FIG. 4 shows the development of the percentage of sparking failures in accordance with time expressed as equivalent motor hours. That failure percentage remained substantially less than 1% for the entire duration of the test, whilst it rapidly reached a level of several percent in the case of the reference material.

The very substantial and long-lasting decrease in the failure rate with the ceramic material according to the invention allows an increase in the service life and reliability of the plug to a remarkable degree.

The invention claimed is:

1. A method for manufacturing a high-energy, low-voltage ignition plug comprising a ceramic material between its electrodes, comprising the steps of:
   forming an admixture by mixing in a container containing a liquid, from 50 to 75% by mass of a compound which forms a conductive phase and from 25 to 50% by mass of one or more materials which allow the formation of insulating phases of yttrium garnet after thermal processing;
   pulverising, drying and sieving the admixture;
   pressing or injecting the admixture into a mould;
   carrying out sintering of the admixture so as to obtain a ceramic material having porosity of between 0 and 30%, the sintering of the admixture being carried out under a controlled argon atmosphere; and
   using the ceramic material in order to constitute a material located between the electrodes of a high-energy, low-voltage ignition plug.

2. The method according to claim 1, wherein the materials are selected from SiC and MoSi2 and admixtures thereof.

3. The method according to claim 1, wherein the porosity of the ceramic material obtained is between 0 and 15% during the sintering of the admixture.

4. The method according to claim 1, wherein there is added to the admixture a thermoemissive doping agent at a proportion of up to 30% of the total mass of the compounds which are intended to form the conductive phase and the insulating phases.

5. The method according to claim 1, wherein from 3 to 60% by mass, relative to the total mass of the compounds which are intended to form the conductive phase and the insulating phases, of one or more organic binding or plasticising compounds is added to the admixture, and in that a de-binding operation is carried out after the pressing or injection and before the sintering operation.

6. The method according to claim 5, wherein the pulverising is carried out in two steps, in that the addition of the plasticising agent is carried out between the two steps and in that the second pulverising step is less energetic than the first step.

7. The method according to claim 1, wherein the materials which allow the formation of phases of yttrium garnet are aluminium oxide and $Y_2O_3$.

8. The method according to claim 7, wherein the yttrium garnet is an yttrium aluminium garnet which contains one or more of the compounds $Y_2O_3$, $Al_2O_3$, $YAlO_3$, $Y_3Al_5O_{12}$, $Y_4Al_2O_9$.

9. The method according to claim 4, wherein the thermoemissive doping agent is $LaB_6$.

10. A method for manufacturing a high-energy, low-voltage ignition plug comprising a ceramic material between its electrodes, comprising the steps of:

there is mixed, in a container containing a liquid, from 50 to 75% by mass of a compound which forms a conductive phase and from 25 to 50% by mass of one or more materials which allow the formation of insulating phases of yttrium garnet after thermal processing;

operations are carried out for pulverising, drying and sieving the admixture;

the admixture is pressed or injected into a mould;

sintering of the admixture is carried out so as to obtain a ceramic material having porosity of between 0 and 30%; and the ceramic material is used in order to constitute the material located between the electrodes of a high-energy, low-voltage ignition plug, wherein from 3 to 60% by mass, relative to the total mass of the compounds which are intended to form the conductive phase and the insulating phases, of one or more organic binding or plasticising compounds is added to the admixture, and in that a de-binding operation is carried out after the pressing or injection and before the sintering operation.

11. The method according to claim 10, wherein the pulverising is carried out in two steps, in that the addition of the plasticising agent is carried out between the two steps and in that the second pulverising step is less energetic than the first step.

* * * * *